(12) United States Patent
Haswell

(10) Patent No.: US 7,203,815 B2
(45) Date of Patent: Apr. 10, 2007

(54) MULTI-LEVEL PAGE CACHE FOR ENHANCED FILE SYSTEM PERFORMANCE VIA READ AHEAD

(75) Inventor: Jonathan M. Haswell, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 10/903,438

(22) Filed: Jul. 30, 2004

(65) Prior Publication Data

US 2006/0026364 A1 Feb. 2, 2006

(51) Int. Cl.
G06F 12/00 (2006.01)
G06F 9/26 (2006.01)

(52) U.S. Cl. ...................................... 711/202
(58) Field of Classification Search ............... 711/118, 711/202
See application file for complete search history.

(56) References Cited

U.S. PATENT DOCUMENTS

| 2003/0158873 | A1* | 8/2003 | Sawdon et al. | 707/204 |
| 2003/0182389 | A1* | 9/2003 | Edwards | 709/213 |
| 2004/0143711 | A1* | 7/2004 | So et al. | 711/144 |

* cited by examiner

Primary Examiner—Kevin L. Ellis
Assistant Examiner—Hamby S. Ahmed
(74) Attorney, Agent, or Firm—Joseph P. Curtin, L.L.C.

(57) ABSTRACT

A physical read ahead is implemented at the filing system level by using a two-level page cache. When a request is received for a page of data within a file, such that the file has a corresponding inode number, a page cache is searched for the requested page of data based on the corresponding inode number and a page number corresponding to the requested page of data. The request is translated into an actual location on the storage device when the page of data is not found in the page cache, and a search of the page cache is performed using an inode representing the storage device. A handle identifying the page of data in the page cache is updated to logically associate the page with a user file inode. Least recently used physical read-ahead data is evicted from the page cache.

8 Claims, 1 Drawing Sheet

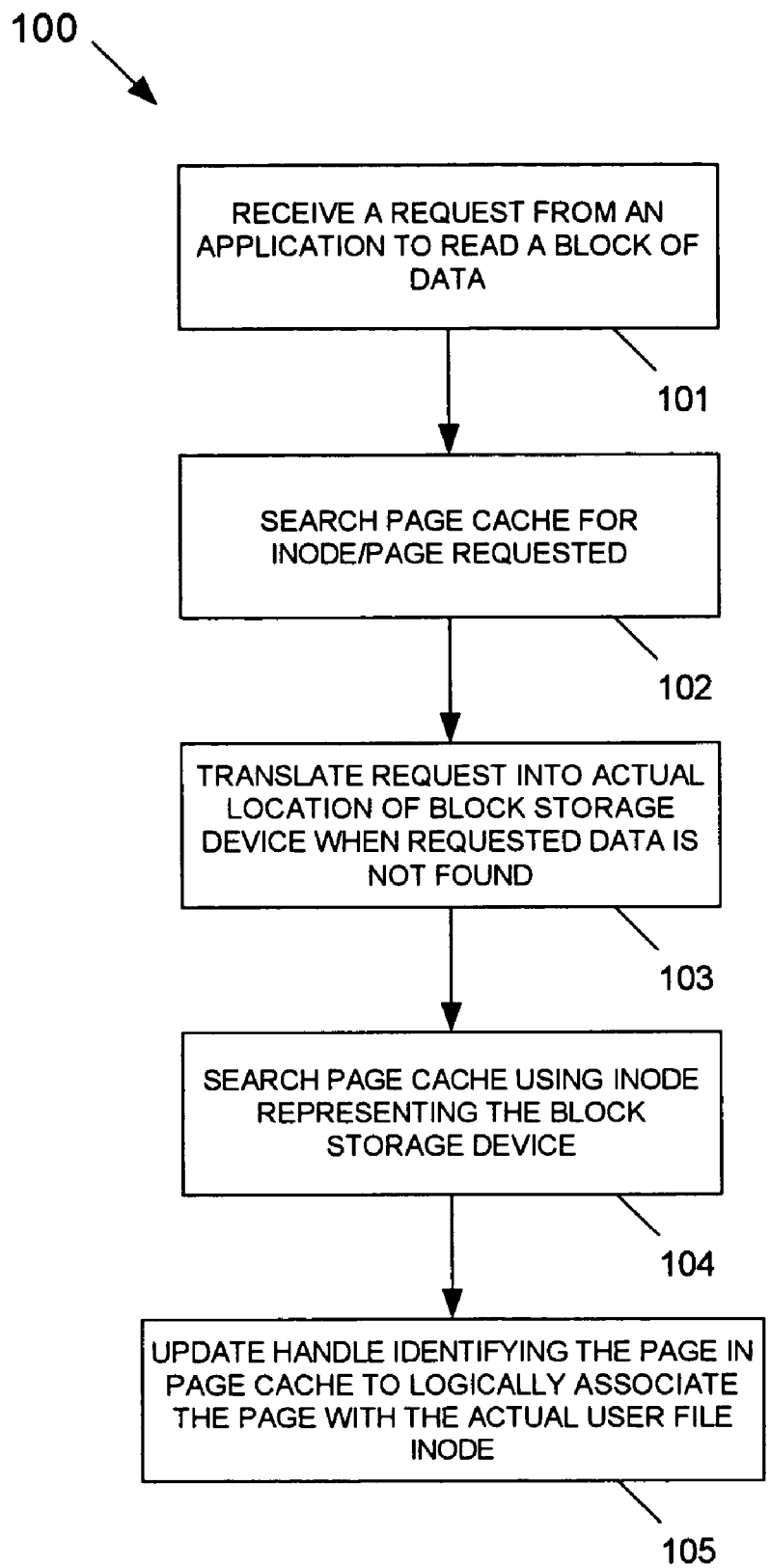
FIGURE

MULTI-LEVEL PAGE CACHE FOR ENHANCED FILE SYSTEM PERFORMANCE VIA READ AHEAD

BACKGROUND OF THE INVENTION

1. Field of the Invention

The present invention relates to computer-based file systems. More particularly, the present invention relates to a technique for efficiently reading data ahead in a computer-based file system.

2. Description of the Related Art

Traditional UNIX-type systems implement a logical form of read ahead. When an application requests a block of data, the system reads n blocks ahead from the requested block of data within the data file based on the assumption that the application is likely to require the n blocks of data next. The exact distance to read ahead is determined based on a heuristic for detecting random versus sequential types of file access from an application. The decision to read ahead and how far is made at the file level. The read ahead may require multiple accesses to the media when all of the data that is to be read ahead is not sequential to the data that has been actually requested.

When a request to read specific blocks is received by an intelligent-type host-bus adapter (HBA) controller or even by an intelligent-type drive, then it is usual that a physical read ahead be performed. Hence, when specific sectors are requested from the disk by an operating system, these types of intelligent devices will read n additional sequential sectors from the media and store the read-ahead sectors in a local memory of the controller or drive.

While a logical read ahead at the filing system level and a physical read ahead at the device level improves performance, there are still a number of drawbacks. For example, one drawback is that heuristics are required at each level of a system that performs read ahead in order for determining how far each read ahead should be. At lower levels of the system, the heuristics do not have access to information on file layout that could benefit their optimization. Consequently, the heuristics at a lower level of the system may read ahead data that is totally unrelated to the file in question and, hence, delay subsequent read requests.

Another drawback is that each controller having memory must use heuristics to determine how to evict read-ahead data from the limited-sized memory buffers. Again, there is insufficient knowledge at lower levels of the system to make data eviction efficient. Additionally, the limited-sized buffers are small in comparison to main system memory. Yet another drawback is when data is read ahead into the buffer of a disk drive via a physical read ahead, there will be a delay from the time when the operating system requests the data to the time when the data can be transferred from the disk drive or the controller to the main system memory. Accordingly, the read requests may be delayed in a queue with other requests that have been previously received.

Still another drawback relates to the efficiency of issuing a small number of read requests for large blocks of data as opposed to issuing many requests for small blocks of data. When read requests going to controllers to obtain data they have read ahead physically can be reduced, the total number of commands/interrupts handled by the system can be accordingly reduced. Consequently, overall system efficiency would be improved a when physical read ahead is specified from the filing system as part of a normal read command, thereby avoiding later-received commands that would be required for the controller/disk to supply data that had already been physically read ahead.

Consequently, what is needed is a way to increase the effectiveness of read-ahead caching at the system level.

BRIEF SUMMARY OF THE INVENTION

The present invention provides a way to increase the effectiveness of read-ahead caching at the system level.

The advantages of the present invention are provided by a method of reading data from a storage device, such as a disk drive, an optical drive, a flash memory disk or other solid state memory device, or a RAID array of storage devices, in which a request is received for a page of data within a file, such that the file has a corresponding inode number. A page cache is searched for the requested page of data based on the corresponding inode number and a page number corresponding to the requested page of data. The request is translated into an actual location on the storage device when the page of data is not found in the page cache, and a search of the page cache is performed using an inode representing the storage device. A handle identifying the page of data in the page cache is updated to logically associate the page with a user file inode. Least recently used read-ahead data is evicted from the page cache.

BRIEF DESCRIPTION OF THE DRAWINGS

The present invention is illustrated by way of example and not by limitation in the accompanying sole FIGURE that depicts an exemplary flow diagram for performing a read ahead according to the present invention.

DETAILED DESCRIPTION OF THE INVENTION

The present invention increases the effectiveness of read-ahead caching at the system level by efficiently implementing a physical read ahead that uses a two-level page cache. The present invention is particularly useful in view of the increasing tendency to consider disk-drive-based storage as being more sequential than random in nature and, thus, the trend toward write anywhere or log-structured filing systems.

Most operating systems use a page cache that stores blocks of data that have been read from or written to a disk. The pages in the cache are usually addressed via the file they are in, specified by, for example, an inode number that identifies the file store on the storage device and a page number within that file. As used herein, the term "inode number" means a unique number or pointer that is used by a file system to identify a file and the pages in the page cache containing data from the file. To read any data into the page cache, the data must be associated with a file, i.e., with an inode and a page number. When performing physical read ahead, the actual contents of the data on the disk that is going to be read ahead into the page cache may not yet be known by the filing system. Consequently, this data could not traditionally be put into the page cache.

The present invention uses an additional file, i.e., an inode, that is created that represents the entire block device, i.e., the entire disk drive, the entire optical drive, the entire flash memory disk, the entire solid state memory device, or RAID array. The sole FIGURE depicts an exemplary flow diagram 100 for performing a read ahead according to the present invention. When the filing system receives a request from an application to read a block of data, the filing system determines the logical read ahead required in the normal manner. That is, the filing system determines to read n additional pages from the required inode. In a subsequent step, after determining the physical locations of the blocks to satisfy the received request, the filing system then applies a suitable heuristic for determining the degree of physical read ahead for each read request going to a device. The additional pages are stored in the page cache using the inode for the device and the physical offset from the start of the device. Referring to the FIGURE, when, at step 101, the filing system is looking for a page of data to satisfy a request, flow continues to step 102 where the filing system searches the page cache in a conventional manner looking for the inode/page requested. When the data is not found, the filing system translates the request at step 103 into the actual location on the device and then at step 104 performs a second search of the page cache using the inode representing the device according to the present invention. When the page is found during the second search, the handle identifying the page in the page cache is updated at step 105 to logically associate the page with the actual user file inode, as opposed to the device inode.

Without any substantial modification to the page cache of an operating system, the present invention implements physical read ahead with the potential for enhanced heuristics relating to what data to read ahead, a corresponding reduction in the number of commands going to a storage device, and multiple page caches with arbitrary boundaries between them are avoided creating. Thus, the present invention flexibly balances logical and physical read ahead within a single memory pool.

When data is evicted from a page cache, the representation of the data in the page cache by the present invention, i.e., whether the data is associated with a file or is just a page from a block storage device that has not yet been associated with a file, can be used to assist in determining the next best candidates for eviction. In one exemplary embodiment, the representation of data in a page cache according to the present invention as a file or just a block in a block storage device can be used to enhance a Least Recently Used (LRU) mechanism for determining when to evict physical read-ahead data from the page cache. As an alternative embodiment of the present invention, the LRU algorithm could use the representation of the data in a page cache according to the present invention to evict physical read-ahead data more aggressively than logical read-ahead data as it is less likely to be used in the future.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of reading data from a block storage device, comprising:
   receiving a request for a page of data within a file, the file having a corresponding inode number;
   searching a page cache for the requested page of data based on the corresponding inode number and a page number corresponding to the requested page of data;
   translating the request into an actual location on the block storage device when the page of data is not found in the page cache; and
   performing a search of the page cache using an inode representing the block storage device and a page number corresponding to the requested page's offset into the block storage device.

2. The method according to claim 1, further comprising updating a handle identifying the page of data in the page cache to logically associate the page with a user file inode when the requested page was found as a result of the search using the inode representing the block storage device and pages offset into the block storage device.

3. The method according to claim 1, further comprising extending each read command actually sent to the block storage device by a variable amount and storing the additional data returned as a result in the page cache, addressed by the inode representing the block storage device and a page number corresponding to the pages offset into the block storage device.

4. The method according to claim 1, further comprising an algorithm for evicting pages from the page cache, when required to free space or for other reasons, which uses as one of it's inputs, the knowledge as to whether a page is addressed via a user file inode no or a block storage device inode number in the page cache.

5. The method according to claim 1, wherein the block storage device is a disk drive.

6. The method according to claim 1, wherein the block storage device is a RAID array of block storage devices.

7. The method according to claim 1, wherein the block storage device is an optical drive.

8. The method according to claim 1, where the block storage device is one of a flash memory disk and a solid state memory device.

* * * * *